United States Patent [19]
Reid et al.

[11] Patent Number: 5,176,103
[45] Date of Patent: Jan. 5, 1993

[54] ANIMAL FEEDER

[75] Inventors: Alister P. Reid, London; John Kopec; Christopher M. Cornwell, both of Lancashire; Christopher Sumner, Merseyside; Colin S. Mill, Cheshire, all of Great Britain

[73] Assignee: Reilor Limited, England

[21] Appl. No.: 849,525

[22] Filed: Mar. 11, 1992

[30] Foreign Application Priority Data

Mar. 21, 1991 [GB] United Kingdom ............... 9105997

[51] Int. Cl.⁵ .............................................. A01K 5/02
[52] U.S. Cl. .................................................. 119/51.13
[58] Field of Search .............. 119/51.11, 51.12, 51.13, 119/51.14, 51.15, 56.1; 222/650, 548, 528

[56] References Cited

U.S. PATENT DOCUMENTS

| | | | |
|---|---|---|---|
| 3,658,036 | 4/1972 | Caracappa | 119/51.13 |
| 3,826,231 | 7/1974 | Crawford et al. | 119/51.12 |
| 4,249,483 | 2/1981 | Sobky | 119/51.12 |
| 4,421,059 | 12/1983 | Cousino | 119/51.12 |
| 4,450,790 | 5/1984 | Stansbury, Jr. | 119/51.12 |
| 4,805,560 | 2/1989 | Knego et al. | 119/51.12 |

FOREIGN PATENT DOCUMENTS

| | | |
|---|---|---|
| 2574622 | 6/1986 | France . |
| 5488 | 6/1984 | Luxembourg . |
| 1546638 | 5/1979 | United Kingdom . |
| 2128868 | 5/1984 | United Kingdom . |
| 2183984 | 6/1987 | United Kingdom . |

Primary Examiner—Gene Mancene
Assistant Examiner—Thomas Price

[57] ABSTRACT

A rotary feeder for animals comprises a base defining or containing a plurality of food receptacles disposed around the base, an indexable cover rotationally supported by the base and having an opening giving access to each receptable in turn when the cover is indexed. Detachably mounted to the cover and rotatable therewith is a motor drive unit having an output member drivingly engageable with the base and operable, when the motor thereof is periodically energized, to rotate the drive unit and with it the cover so as to index the cover opening in turn from receptacle to receptacle.

25 Claims, 3 Drawing Sheets

ANIMAL FEEDER

The present invention relates to an animal feeder capable of serving portions of food at chosen intervals.

Primarily, but not exclusively, the invention is concerned with feeders for small domestic animals, or pets, such as cats and dogs. With the aid of the invention, an owner could leave an animal unattended for a day or two confident that it will automatically be provided with regular feeds during that time.

An automatic feeder is known which comprises a lidded food receptacle or bowl. The lid is hinged to the latter and is spring-biased to a raised or open position. A timer-controlled latch effectively holds the lid in a lowered or closed position barring access to the food until a pre-set time has elapsed, whereupon the lid is released. It then springs open, i.e. to its raised position. A feeder of this general kind, but which comprises two feed receptacles and two timed independently releasable lids is disclosed in GB-A-2 183 984.

Such known feeders have drawbacks. Only one or two meals can be served so the owner cannot be absent for much longer than a day. The lid(s) when released may fly open quite suddenly. This could startle an animal and discourage it from using the feeders. This type of feeder is often less reliable than is desired.

Another feeder is of circular form. It has several, e.g. five, sector-shaped food receptacles arranged about the centre of the feeder and a rotary cover. The cover has a single sector-shaped cut out which exposes successive food receptacles when the cover is indexed periodically. A clock governs the indexing of the cover.

A commercial circular feeder of this kind is costly to manufacture, because it comprises a significant number of fairly complicated plastics mouldings and parts requiring laborious assembly. The feeder comprises a moulded circular base. This seats a second circular moulding defining the food receptacles, of which there are five. A third circular moulding is the rotary cover. Two further mouldings form a timer housing, which is situated as a peninsula or projection extending outwards from the periphery of the base. In this feeder, an inexpensive and widely-available interval timer featuring a battery-operated quartz clock mechanism is used. Such a mechanism develops very limited torque at its output shaft and is wholly unable to rotate the cover directly. For this reason the designer has had to resort to an escapement-controlled drive for the cover. To this end, a sixth plastics moulding is rotationally secured at the centre of the base for driving engagement with the rotary cover. The sixth moulding incorporates a housing for a torsion spring and notches for a pawl end of a spring-pressed pivoted swing lever. The lever, yet another plastics moulding, is tripped periodically by the quartz clock mechanism. Its pawl end is thus momentarily disengaged from a notch in the sixth moulding, permitting the torsion spring to rotate the sixth moulding and hence the cover trough some 72°, whereupon, the pawl should drop into the next notch.

This known feeder has drawbacks for manufacture and use. Apart from the need to assemble numerous parts, the individual mouldings are quite detailed and the tooling required is costly. Experience has shown that some of its components are subject to breakage, in particular the pawl end of the lever and the sixth drive moulding. The cover moulding is fairly substantial and when the escapement operates, the cover moulding indexes rather suddenly under the impetus of the torsion spring. To prevent the complete feeder from spinning or skating over a smooth floor due to reaction forces upon indexing, the feeder has to be quite heavy. Thus, the raw material cost is comparatively high.

In use, the owner has to remember to switch on the timer and to cock or load the torsion spring by "winding" the cover backwards. Whilst it is easy to soak and wash the cover and receptacle mouldings, the base assembly cannot sensibly be so treated, because of the clock mechanism.

Another drawback is that, in use, the escapement may misfunction, i.e. the pawl may skip a notch. If this happens, the cover will fail to give access to all the food receptacles and the animal will be deprived of one or more feeds.

The present invention aims to overcome many or all of the above-noted drawbacks of existing feeders, especially those relating to circular feeders.

According to the present invention, there is provided a rotary feeder for animals comprising a base defining or containing a plurality of food receptacles disposed around the base, an indexable cover rotationally supported by the base and having an opening giving access to each receptacle in turn when the cover is indexed and, mounted in the cover, preferably detachably, a motor drive unit, the motor of which, when periodically energised, rotates the cover so as to index the cover opening in turn from receptacle to receptacle.

A preferred circular feeder according to the invention comprises but three principal mouldings only. One is a base, which may for instance constitute four food receptacles. The second is a rotary cover. The third is a small cylindrical housing for a battery-powered, controlled drive unit for the cover. The housing fits into a central receiving chamber formed in the cover. This chamber is telescopically and rotationally received by a seating therefor provided in the base moulding. An output member of the drive unit non-rotatably keys to the base and when the drive is activated, the said unit and housing revolve relative to the stationary base. The cover rotates with the housing. The housing and cover rotate stepwise through angles governed by the number and circumferential extent of the food receptacles. Ordinarily the receptacles will be equisized and there may be four of them. The stepwise rotations will therefore be quarter turns or 90°.

The controlled drive unit does not employ a conventional quartz clock movement. Instead, the drive consists of an inexpensive high speed miniature electric motor connected to the output member by a speed-reducing gear train, the combination developing adequate torque for rotating the cover. A control circuit, embodying an oscillator and resettable counter is arranged to activate the motor after a preselected number of cycles have been counted. The number of cycles is related to a chosen interval between feeds, for example 6 or 12 hours. After activating the motor, which then proceeds to drive the cover through the appropriate angle, for instance 90°, the counter resets itself and commences a fresh count, the operation thus repeating itself. It is readily arranged that the motor of the drive unit is unable to rotate the cover by more than one step (for example 90°) in any one time interval which, as stated, may be 6 or 12 hours.

A preferred embodiment of the invention will now be described, by way of example only, with reference to the accompanying drawings, in which.

The illustrated feeder F is primarily intended for domestic use, for feeding cats or dogs. Nevertheless, the invention could be embodied in forms intended for feeding other animals, for instance at farms and zoos.

Feeder F comprises three principal components, a base 1, a cover 3 and a controlled drive unit 5. The base 1 and cover 3 are circularly-shaped plastics mouldings, and the drive unit 5 has a cylindrical moulded plastics housing 7.

The base 1 has a seating for the cover 3 by which the latter is journalled or mounted for free rotation. The cover 3 detachably receives the drive unit 5, the two when assembled being fast for joint rotation. An output element of the drive unit 5 engages the base 1 and the arrangement is such that, thanks to coaction between the output element and the base, when the drive unit 5 is operated it and the cover 3 will jointly rotate relative to the base, the latter remaining stationary.

Figure 1:
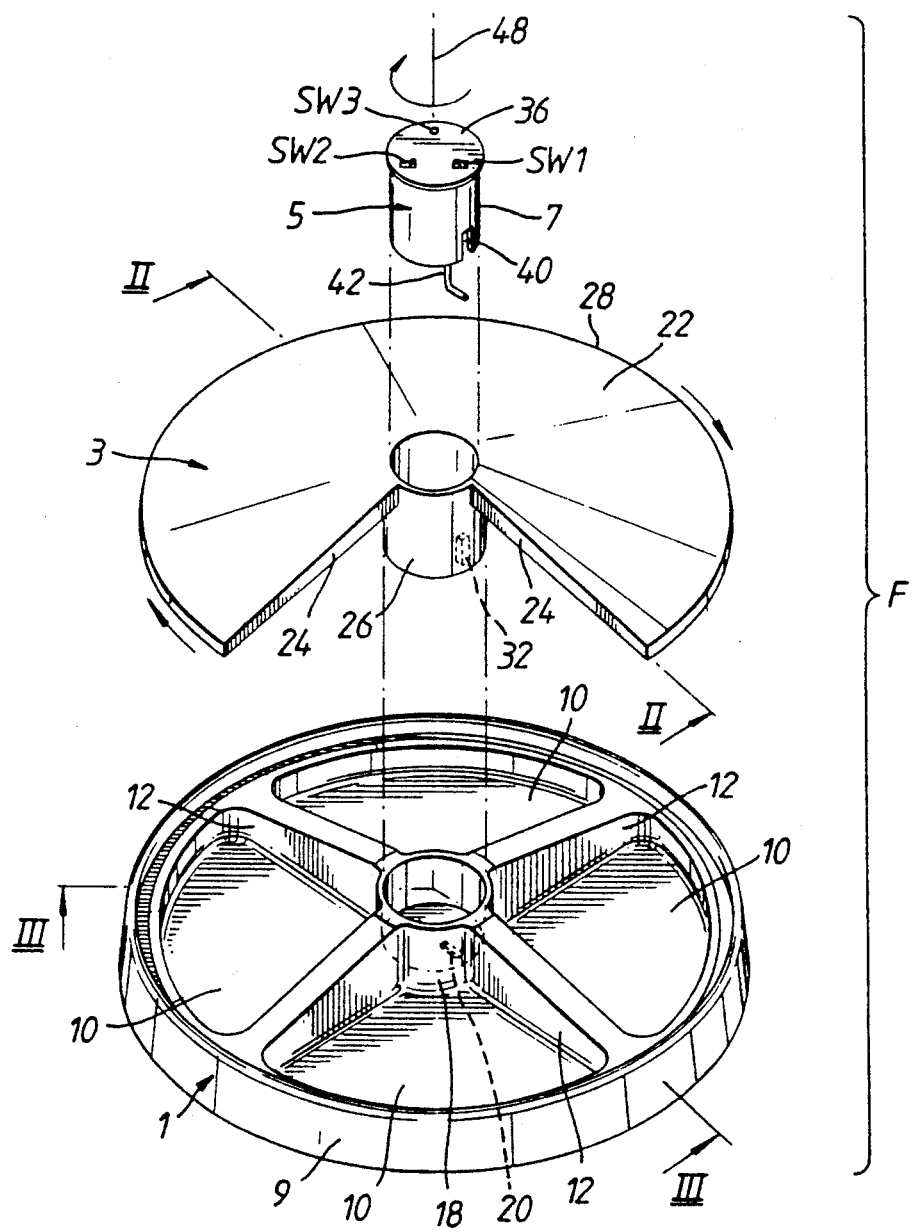
FIG. 1 is an exploded perspective view of an animal feeder according to the invention.
Figure 3:
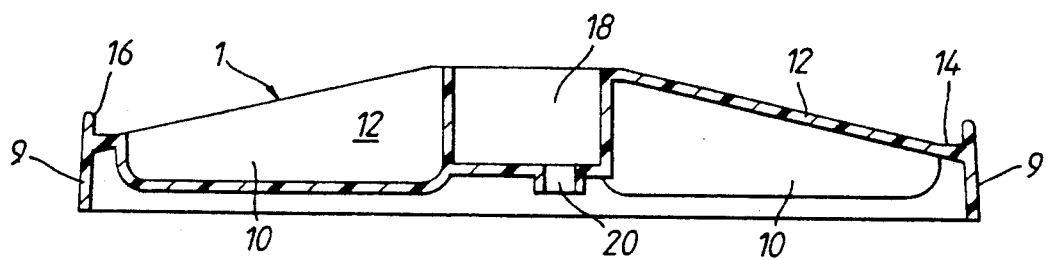
FIG. 3 is a cross-section on the line III—III of FIG. 1.

The base 1 in this embodiment FIGS. 1 and 3) has a peripheral skirt 9 on which the base will stand, and integral food receptacles 10 spaced equidistantly about the centre of the base. As shown, there are four receptacles, each having the shape of a circular sector. Four walls 12 in the form of a cruciform separate the receptacles and help to stiffen the base 1. Around the top of the base 1 there is a flat ledge 14 and a short upstanding lip 16. The bottoms of the food receptacles 10 merge smoothly via rounded corners with the walls 12 and with a central cup-shaped formation 18. The central cup 18, which is cylindrical, forms a seat to support the cover 3 for rotation atop the base 1. A key slot formation 20 in the bottom of cup 18 is provided for a purpose to be explained hereafter.

The food receptacles 10 avoid sharp corners for ease of cleaning, for instance using an automatic dishwasher. Each receptacle is conveniently sized such as to accommodate the contents of a small, 200 g., can of pet food.

As shown, the base defines four receptacles 10. However, the feeder could be modified to have fewer or more receptacles, for instance three or five. (The drive unit 5 will then have to be adapted to index or rotate the cover through 120° or 72°, respectively).

The receptacles 10 need not be sector-shaped, but this is presently considered the most convenient shape to utilise for a circular, rotary-type feeder. The receptacles could, for instance, take the form of circular bowls.

It is most cost-effective to make the receptacles 10 integral with the base 1 as illustrated. Nevertheless, it is within the scope of the invention to provide the receptacles in a moulding separate and removable from the base, or to provide them as individual bowl members to be removably fitted in the base.

Figure 2:
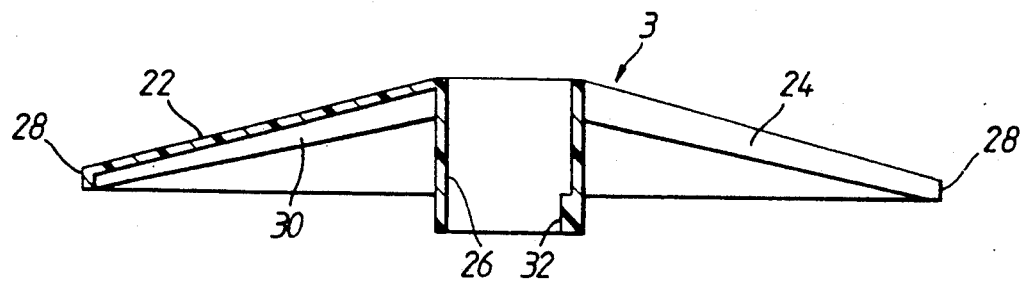
FIG. 2 is a cross-section on the line II—II of FIG. 1.

Viewed in elevation, the illustrated base 1 has a shallow truncated, frusto-conical top profile. The cover 3 (FIGS. 1 and 2) is correspondingly shaped. Thus, the cover comprises a shallow frusto-conical disc 22. Disc 22 has an opening or cut-out 24. This gives access, when the cover 3 is indexed, to each food receptacle in turn. The cut-out 24 is of similar outline to the shape of receptacles 10, and hence in this embodiment is sector-shaped. Depending from the crown of the disc 22 is a tubular portion 26. The tubular portion drops into and seats in the central cup 18 and is freely rotational therein. The bottom edge of the tubular portion 26 rests upon the upward-facing surface of the bottom of the cup 18. When so seated on the base 1, the cover has its periphery 28 just inset within the upstanding lip 16 of the base. To rigidify the cover 3, ribs 30 may be moulded into the underside of the disc 22. Finally, the tubular portion 22 has one or more inwardly-projecting ribs 32 adjacent its bottom edge, for non-rotational engagement with the housing 7 of the drive unit 5.

Figure 4:
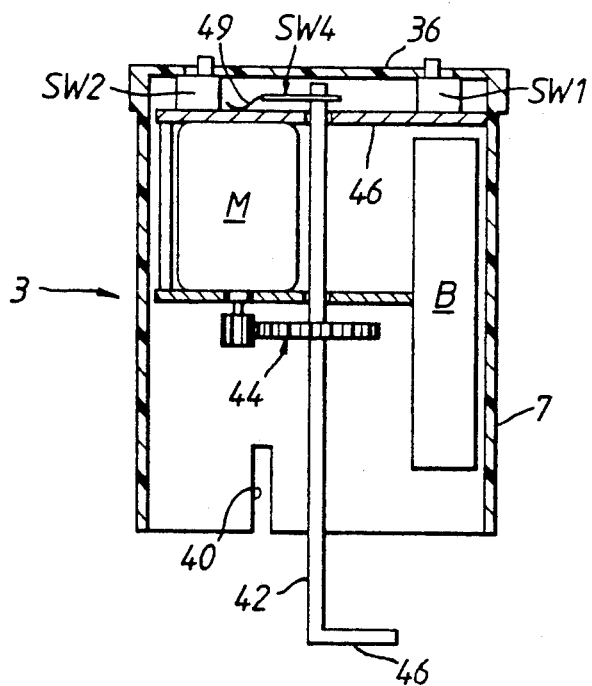
FIG. 4 is a schematic illustration of a controlled drive unit of the feeder.

The said housing 7 (FIGS. 1 and 4) fits into the tubular portion 22 of the cover 3. Housing 7 is of cylindrical shape and has a top face 36 at which three switches are exposed for operation by the user. Switch SW1 is an on/off switch for the drive unit 5; switch SW2 is a selector switch which determines the intervals between feeds (for example 6 or 12 hours), and switch SW3 is a switch for test purposes or for manually activating the drive unit 5 for advancing the cover. It is operable in this instance by pushing it by using e.g. an inserted probe of some kind.

The housing 7 is made to fit non-rotatably within the tubular portion 22. The arrangement is such that the cover and housing will together rotate relative to the base 1. To render the housing 7 and tubular portion 22 fast for joint rotation, the housing 7 could be an interference or frictional fit inside portion 22. In the present embodiment, however, the required joint rotation is secured by the interengagement of the aforesaid rib(s) 32 with a slot or slots 40 in the cylindrical wall of the housing 7. The interengagement serves also properly to locate the housing 7 axially of the tubular portion 22.

Inside the housing 7 is an electric motor M, a battery B to power same, an output member 42, a gear train 44 and a printed circuit board (pcb) 46 containing components of a motor control circuit. The pcb 46 is appropriately fastened to the housing 7. The switches SW1-3 are mounted on the pcb 46 as is the motor M and terminals (not shown) for battery B. The motor output shaft is connected to the gear train 44 which is also connected to the output member 2. The gear train 44 comprises a set of worms and pinions selected to attain a desired cover rotation speed depending on the speed of the motor M. The output member 42 is aligned with the central axis of the housing 7 and projects downwardly therefrom. At its bottom end, the output member 2 is shaped or adapted to fit non-rotatably into the key slot formation 20 of the base 1. In this instance, the terminal end of member 42 is cranked through 90°. The arrangement is such that with the cranked end 47 of member 42 anchored, i.e. engaged in the key slot 20, member 42 cannot rotate relative to the base 1. Thus, when the motor M is energised, it, the pcb 46, gear train 44, motor M, battery B, housing 7 and cover 3 will all rotate about the axis of the output member 42 the latter being coincident with the central and turning axis 48 of the feeder. Still further, the output member carries a wiper 49 of a rotary switch SW4 having contacts on the pcb 46. The contacts of switch SW4 move relative to the stationary wiper 49 when the pcb 46 (etc) rotates during energisation of the motor M. The purpose of switch SW4 will appear from the following description.

Figure 5:
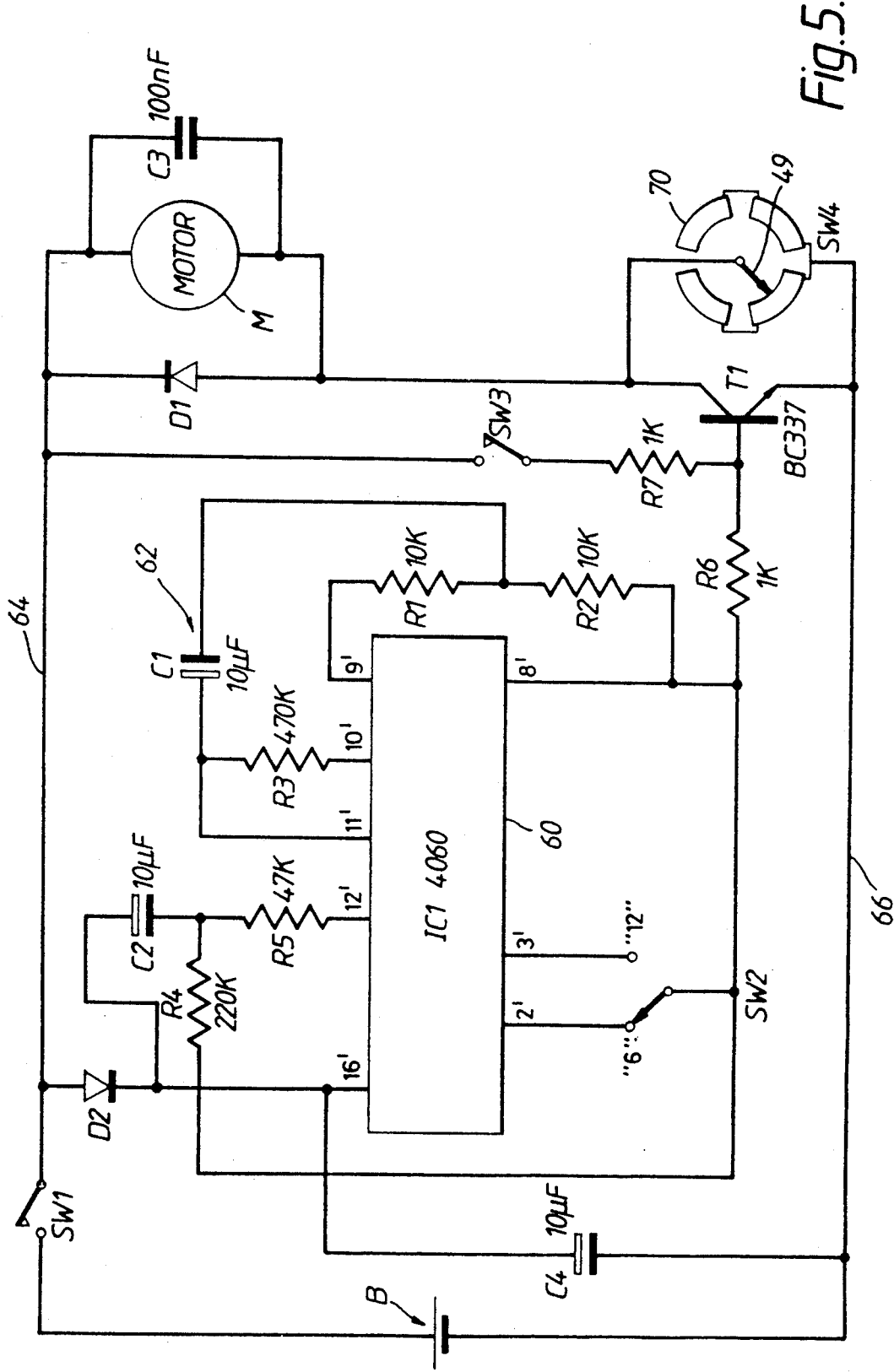
FIG. 5 is a circuit diagram of the electronic arrangement of the controlled drive unit.

Referring now to FIG. 5, the control circuit C for the motor M is shown in more detail. At the heart of the circuit is an integrated circuit 60, in this embodiment a CD4060B or equivalent type, which is essentially a fourteen stage binary counter with internal inverters. The inverter outputs are connected to the pins 8', 9' and 10' and an oscillator 62 is formed by connecting the resistors R1 and R2 in series across the pins 8' and 9' and by connecting the midpoint of the resistors R1 and R2 to the pin 10' through a series connection of a capacitor C1 and a resistor R3. The output of the oscillator is applied to the pin 11' and consists of a square wave having a 5.27 second cycle time.

The pin 11' constitutes the input of the binary counter which after 4096 cycles (6 hours) produces a positive output on pin 2' and after 8192 cycles (12 hours) produces a positive output on pin 3'. Selector switch SW2 is used to select which of these outputs is applied through a resistor R6 to the base of a transistor T1 to render the transistor conductive.

The positive terminal of the battery B is connected through on/off switch SW1 to a positive line 64 and the motor M is in series with the emitter collector circuit of the transistor T1 between the positive line 64 and a negative line 66 which connects to the negative terminal of the battery B. The motor is shunted by a capacitor C3 and by a diode D1, both of which act to suppress spikes generated by the motor. The transistor T1 is shunted by a wiper switch SW4 which has a wiper arm 49 driven by the motor and electrically connected to the collector of the transistor T1 and a number of contacts 70, in this embodiment four contacts, separated by non-conductive spaces and connected to the negative line 66. It can thus be seen that when the switch SW1 is closed the motor is energised when either the transistor T1 is energised or the wiper arm 49 engages one of the contacts 70.

The output voltage from pin 2' or pin 3' which is supplied by the switch SW2 to the base of the transistor T1 is also supplied through a time delay circuit to the reset pin 12' of the integrated circuit. The delay circuit consists of a resistor R4 and a capacitor C2 connected in series between the switch SW2 and the power input pin 16' of the integrated circuit, the common point of R4 and C2 being connected to the reset pin 12' through a resistor R5 which acts to protect the integrated circuit from damage if the power is switched off by SW1 when C2 is in a charged state.

The power input pin 16' is connected to the positive line 64 by a diode D2 which protects the integrated circuit against damage if the battery is connected the wrong way round, and to the negative line 66 by a capacitor C4 which isolates the integrated circuit from electrical noise from the motor and provides a stable input voltage at pin 16'.

The control circuit also incorporates a test switch SW3 connected to the positive line 62 and through a resistor R7 to the base of the transistor T1.

In operation when the switch SW1 is closed, the motor will normally not be energised as T1 is not energised and the wiper arm 49 of the switch SW4 is on a non-conductive space. The integrated circuit is however energised and the oscillator produces its square wave output to the timer input at pin 11'. After six hours the positive output on pin 2' appears and, if SW2 is in the six hour position the transistor T1 and the motor are energised. As the motor operates and the pcb 46 rotates, the wiper arm 49 and the next contact 70 are brought into engagement before the expiry of the time delay imposed by R4 and C2 allows the positive output on pin 2' to be applied to the reset pin 12'. When the circuit is reset the positive output on pin 2' is removed and the transistor is de-energised. The motor however remains energised through the switch SW4 until the wiper arm 49 reaches the next non-conductive space.

This cycle of events is repeated every six (or twelve) hours.

If there are fewer or more than four receptacles 10, the drive unit 5 will be required to index the cover 3 through angular steps greater or smaller than 90°. To this end, the contacts 70 of the rotary switch SW3 will be modified as to their number and angular extents.

In use, the cover 3 is lifted off the base 1 and portions of food or drink are placed in the receptacles 10. The cover is then refitted, ensuring that the drive element 42 engages the slot 20 of the base 1. There is no need to disassemble the cover and drive unit 5. The selector switch SW2 is set for feed intervals of 6 or 12 hours as desired, and the switch SW1 is set to "on". As a precaution, the user may activate the switch SW3 e.g using the point of a ball pen or the like, to check that all is well. If the user has placed different foods/drinks in the receptacles 10, he can operate switch SW3 to cause the cut-out 24 to move into registry with a chosen receptacle that is to initiate the feeding cycle in his absence.

After use, the drive unit 5 can be detached from the cover 3, its top wiped clean if necessary, and the cover and base 1 soaked and washed for instance in a dishwasher.

As taught herein, positive drive interconnection between the output member 42 and the base 1 comprises a non-rotary anchorage for the output member. Alternative drive interconnections are possible, however, including rotary interconnections. Thus, by way of example, the output member 42 could be fitted with a friction wheel engagable with the seat or cup 18 or the base 1. Yet again, member 42 could be fitted with a toothed gear wheel engagable with teeth moulded into the base 1. In either case, the output member will be driven as if to rotate in one direction relative to the stationary base while the drive unit 5, its housing 7 and cover 3 will rotate in the opposite direction.

In the foregoing embodiment, the drive unit housing 7 and cover 3 are keyed to one another or otherwise arranged for joint rotation. That is they rotate together, relative to the stationary base 1. In alternative embodiments only the cover 3 may rotate, the base 1 and drive unit 5 remaining stationary.

In such an embodiment, the drive unit 5 could have an element to anchor it non-rotatably with the base, the element for instance being similar to output member 42 except that it is secured in the drive unit 5 against rotation and is not drivingly intercoupled with the motor M. Through a suitable gear train, the shaft of motor M can be connected with a driven friction wheel or gear drivingly inter-engagable with the cover. For instance, such wheel or gear may drivingly engage the cover cylindrical portion 26 by having its periphery project suitably through an opening in the side wall of housing 7, into drive contact with portion 26. Alternatively, such wheel or gear could be located beneath the bottom of housing 7, again to contact portion 26 of the cover. Other arrangements for rotating the cover 3 about a stationary drive unit 5 and base 1 will occur to the addressee.

The illustrated embodiment has the drive unit 5 dismountable from the cover 3, and this is preferred for practical purpose including dish-washing.

If desired, however, the drive unit 5 could be secured permanently in the cover 3—for instance as an integral part of it. This would be satisfactory provided care is taken not to immerse the drive unit in water. Precautions could be taken in the design and manufacture of the feeder to seal such a combined cover/drive unit against ingress of washing liquids. Special attention may be needed to seal a battery compartment of such a combined unit. Generally speaking, at present such an arrangement is not preferred due to the complication and on cost grounds.

The present invention also provides a simplified version of the illustrated embodiment, the simplified version again having a drive unit mounted in the cover. According to this aspect of the invention, there is provided a rotary feeder for animals comprising a base defining or containing at least one receptacle for food, a cover rotationally supported by the base and having an opening for giving access to food or the like provided by the pet's owner and, mounted in the cover, preferably detachably, a mechanical clockwork motor movement to rotate the cover and its opening slowly and continuously relative to the base. The motor can be arranged to rotate the cover through 360° over a predetermined time period which for instance could be of the order of 24, 30, 36 or 48 hours. The amount of food accessible by the pet at any one time will be limited by the size of the opening. Once that food has been consumed, the pet will have to wait for some time before the cover and opening have rotated uncovering more victuals. Thus, the unattended pet's feeding is controlled over an extended period of e.g. 36 hours.

An embodiment of this aspect of the invention is not separately illustrated, but is represented by, and in many ways is similar to, the feeder shown in the accompanying drawings and it will now be described in detail.

The base can be in essence the same as the illustrated base 1, and thus can include a peripheral skirt, a food (or drink) containing area and a central cup-shaped formation equivalent to cup 18. The food containing area can be subdivided into several receptacles as before by upstanding ribs equivalent to walls 12, e.g. to separate liquids from solids. If desired, such ribs could be omitted whereupon the base will define or contain a single food receptacle of annular for between the outer periphery of the base and the central cup The cover of this embodiment can have the same form as the illustrated cover 3 described hereinbefore. Thus, it can comprise a frusto-conical disc with a cut-out forming the access opening, and a central depending tubular portion to drop into and seat in the central cup of the base, so as to be freely rotatable therein. The disc can be of such diameter as to interfit closely within an upstanding rib which encircles the base about the food containing area (cf. rib 16 of FIG. 2).

The motor unit of this embodiment again comprises a cylindrical housing with a top face as shown in FIG. 1, save that switches SW1-SW3 are omitted and instead there will be an opening for a winder key for winding up the clockwork movement. Once more, the housing will be slotted to engage a rib inside the tubular portion of the cover, to enable the housing and cover to interlock for joint rotation. A slot and rib as shown in FIG. 1 at 40 and 32 will again suffice.

Inside the housing a basically conventional clockwork movement is mounted. The movement has an output shaft arranged through appropriate gearing to rotate once in some predetermined time period e.g. 36 hours.

The output member or shaft of the clockwork movement can be cranked or L-shaped as shaft 42 of the illustrated embodiment. The cranked end will non-rotationally engage a receiving slot or the like provided in the bottom of the cup of the base. Such an arrangement may be preferred where the base has dividing ribs defining a plurality of separate food receptacles.

Alternatively, the output member or shaft of the clockwork movement can be straight, rather than cranked, in which event it may have a multi-toothed pinion affixed thereto. The base will then have a correspondingly-shaped aperture or recess in the bottom of its cup formation, to be engaged non-rotationally by the pinion. The output shaft, pinion and shaped aperture will, of course, be centrally aligned within the cup of the base and the tubular portion of the cover. The provision of a multi-toothed pinion in combination with the correspondingly-shaped aperture enables the user to dispose the cover and its feed access opening in substantially any rotational position with respect to the base and to portions of food placed in the receptacle(s).

In operation, the pet's owner will place feed in the base receptacle(s), place the cover on the base and insert the motor housing into the cover. The clockwork movement will commence running as soon as its spring has been wound up. Since its shaft is held against rotation by the base, the movement and its housing will rotate relative to the base, and the cover will rotate with them. Unlike the illustrated embodiment, in the clockwork version just described the cover rotation will be continuous rather than step-wise. Apart from this, the clockwork version functions in the same way as the illustrated embodiment and possesses essentially the same simplicity, benefits and advantages as the illustrated embodiment.

We claim:

1. A rotary feeder for animals comprising a base, a plurality of food receptacles disposed around the base, an indexable cover rotationally supported by the base and having an opening giving access to each receptacle in turn when the cover is indexed and a motor drive unit mounted in the cover and having a motor which, when periodically energised, is operative to rotate the cover so as to index the opening thereof in turn from receptacle to receptacle.

2. A feeder according to claim 1, wherein said drive unit is detachably mounted in the cover.

3. A feeder according to claim 1, wherein the drive unit and cover are rotatable jointly, relative to the base.

4. A feeder according to claim 1, wherein the drive unit and cover are permanently secured to one another.

5. A feeder according to claim 3, wherein the drive unit is integral with the cover.

6. A feeder according to claim 1, wherein an output member of the drive unit is connected with the motor and drivingly connected with the base, the unit being operative when the motor is periodically energized, to rotate relative to the base and to rotate the cover therewith.

7. A feeder according to claim 6, wherein the output member is non-rotatably engageable with the base when the motor is periodically energised.

8. A feeder according to claim 6, wherein the output member of the drive unit is a shaft which extends centrally relative to the when assembled base, cover and drive unit, the shaft having a cranked free end which is non-rotatably receivable in a slot formation provided in said base; said base has a central, upwardly open cup-shaped seating for said cover and said slot formation is provided in said seating; said cover comprises a cover disc, to overlie the receptacles, and a depending tubular portion rotatably nestable in said seating; and said drive unit is non-rotatably mounted in said tubular portion.

9. A feeder according to claim 1, wherein the drive unit has an anchoring element engagable with the base to render the drive unit stationary with respect to the base, and the drive unit motor is coupled to a drive element engagable with the cover for rotating the cover when the motor is energised, relative to the drive unit and the base.

10. A feeder according to claim 1, wherein the drive unit comprises a battery-powered motor and a controller therefor, the controller comprising an oscillator and a resettable counter responsive to the oscillator and operative after counting a preset number of oscillator cycles (a) to cause the motor to be energised to index the cover and (b) to reset itself and commence a fresh count prior to re-activating the motor for indexing the cover again.

11. A feeder according to claim 10, wherein the controller is presettable to count cycles corresponding to preselected time delays between indexing of the cover, whereby the cover is indexable at regular, chosen intervals.

12. A feeder according to claim 1, wherein the receptacles are of like shape and size, and the cover opening has a corresponding shape and size.

13. A feeder according to claim 12, wherein the receptacles are sector-shaped and the cover opening is a sector-shaped cutout.

14. A feeder according to claim 1, wherein the base comprises a central, upwardly open cup-shaped seating for the cover, and the cover comprises a cover disc, to overlie the receptacles, and a central depending tubular portion rotatably nestable in said seating.

15. A feeder according to claim 14, wherein the drive unit comprises a housing non-rotatably nested in said tubular portion, and said drive unit and cover are rotable jointly relative to the base.

16. A feeder according to claim 1, wherein the receptacles are integral with the base.

17. A feeder according to claim 1, wherein the base, the cover and a housing for the drive unit are plastics mouldings.

18. A rotary feeder for animals comprising a base having associated therewith at least one food containing area, a cover rotationally supported by the base and having an opening therein for giving access to a predetermined portion of the food containing area as such cover is rotated, and a motor drive unit mounted in the cover and having a clockwork motor drive operative to continuously rotate the cover and its opening relative to the base.

19. A rotary feeder as in claim 18, wherein said clockwork motor drive is a conventional mechanical clockwork movement received in said motor drive unit, and wherein said motor drive unit includes an opening through which the clockwork movement may be wound.

20. A rotary feeder as in claim 18, wherein the base includes a central cup-shaped formation in which the motor drive unit is received and the base defines an annular food containing area formed between the outer periphery of the base and the central cup.

21. A rotary feeder as in claim 20, wherein the base includes a plurality of walls situated in the food containing area so as to subdivide the area into a corresponding plurality of food receptacles.

22. A rotary feeder as in claim 18, wherein the clockwork motor drive has an output shaft arranged through gearing for non-rotational engagement with the base so that operation of the clockwork motor drive rotates the cover 360 degrees in a predetermined period of time.

23. A rotary feeder as in claim 22, wherein the predetermined period of time is within a range of from about 12 hours to about 48 hours.

24. A rotary feeder as in claim 22, wherein the output shaft is comprises a bent end to non-rotatably engage a receiving slot in the base.

25. A rotary feeder as in claim 22, wherein the output shaft comprises a straight end, the straight end having affixed thereto a multi-toothed pinion so as to non-rotatably engage a correspondingly shaped aperture in the base.

* * * * *